United States Patent [19]

Sparks et al.

[11] Patent Number: 5,110,644

[45] Date of Patent: May 5, 1992

[54] COMPOSITION MATERIAL TUBE SUBSTANTIALLY INSENSITIVE TO THE VARIATIONS OF LENGTH UNDER THE EFFECT OF THE INTERNAL PRESSURE

[75] Inventors: Charles Sparks, Le Vesinet; Pierre Odru, Fontenay Sous Bois; Marcel Auberon, Le Maillan; Jean-François Fuchs, Castelnau Medoc, all of France

[73] Assignee: Institut Francais Du Petrole et Aerospatiale, Malmaison, France

[21] Appl. No.: 532,361

[22] Filed: Jun. 4, 1990

Related U.S. Application Data

[63] Continuation of Ser. No. 316,787, Feb. 28, 1989, abandoned.

[30] Foreign Application Priority Data

Feb. 28, 1988 [FR] France .................. 88 02500

[51] Int. Cl.$^5$ .............................................. B32B 5/28
[52] U.S. Cl. .................... 428/36.3; 166/242; 166/243; 138/124; 138/172; 138/130; 138/144; 138/DIG. 2; 428/36.1; 428/35.7; 428/377; 428/113; 428/408; 428/902
[58] Field of Search ............... 464/181, 183, 903; 52/720; 166/242, 243; 138/123, 124, 125, 126, 172, DIG. 2, 129, 130, 132, 140, 144; 428/34.5, 36.1, 36.3, 35.7, 377, 379, 105, 113, 408, 902

[56] References Cited

U.S. PATENT DOCUMENTS

| | | | |
|---|---|---|---|
| 3,212,582 | 10/1965 | Brown | 166/242 |
| 3,220,437 | 11/1965 | Safford | 166/242 |
| 3,234,723 | 2/1966 | Brown | 166/242 |
| 3,481,369 | 12/1969 | Ganahl | 138/144 |
| 4,023,801 | 5/1977 | Van Auken | 428/34.5 |
| 4,024,913 | 5/1977 | Grable | 166/242 |
| 4,039,006 | 8/1977 | Inoue et al. | 138/129 |
| 4,171,626 | 10/1979 | Yates et al. | 428/34.5 |
| 4,173,670 | 11/1979 | Van Auken | 138/DIG. 2 |
| 4,212,693 | 7/1980 | Saito et al. | 428/34.5 |
| 4,214,932 | 7/1980 | Van Auken | 428/34.5 |
| 4,308,917 | 1/1982 | Dismukes | 166/247 |
| 4,402,346 | 9/1983 | Cheetham et al. | 138/132 |
| 4,431,034 | 2/1984 | Abdullaev et al. | 138/132 |
| 4,555,113 | 11/1985 | Shimazaki et al. | 428/36.1 |
| 4,605,385 | 8/1986 | Pück et al. | 428/36.3 |
| 4,621,980 | 11/1986 | Reavely et al. | 428/902 |
| 4,622,254 | 11/1986 | Nishimura et al. | 428/113 |
| 4,649,963 | 3/1987 | Raghavan et al. | 138/130 |
| 4,657,795 | 4/1987 | Foret | 428/34.5 |
| 4,664,644 | 5/1987 | Kumata et al. | 464/181 |
| 4,946,721 | 8/1990 | Kindervater et al. | 428/36.1 |

Primary Examiner—Ellis P. Robinson
Assistant Examiner—Archene A. Turner
Attorney, Agent, or Firm—Antonelli, Terry, Stout & Kraus

[57] ABSTRACT

A composite material tube, substantially insensitive to the variations of elongation under the effect of the internal pressure, comprising a number n of stable layers of reinforcement fibers, the fibers of each layer (i) being placed at the same winding angle in absolute value, referenced theta, with respect to the axis of the tube with an equal proportion of fibers wound at said angle in one direction (|theta|) as fibers wound in the opposite direction (−|theta|), the fibers of each layer being buried in a matrix which adheres to these fibers. The fibers of the same layer and the associated matrix have a volume referenced Y, the parallel fibers of the same layer and the associated matrix having overall a modulus of elasticity in the natural direction of the fibers, referenced E, wherein said n layers of fibers comply as a whole with the following relationship:

$$0.35 \leq A \leq 0.60$$

where A is equal to the following expression:

$$A = \frac{\sum_{i=1}^{i=n} [E_i Y_i (\sin^2|\text{theta}_i|) \cdot (\cos^2|\text{theta}_i|)]}{\sum_{i=1}^{i=n} [E_i Y_i \sin^4|\text{theta}_i|]}$$

i being the summation index on the different fiber layers.

21 Claims, 1 Drawing Sheet

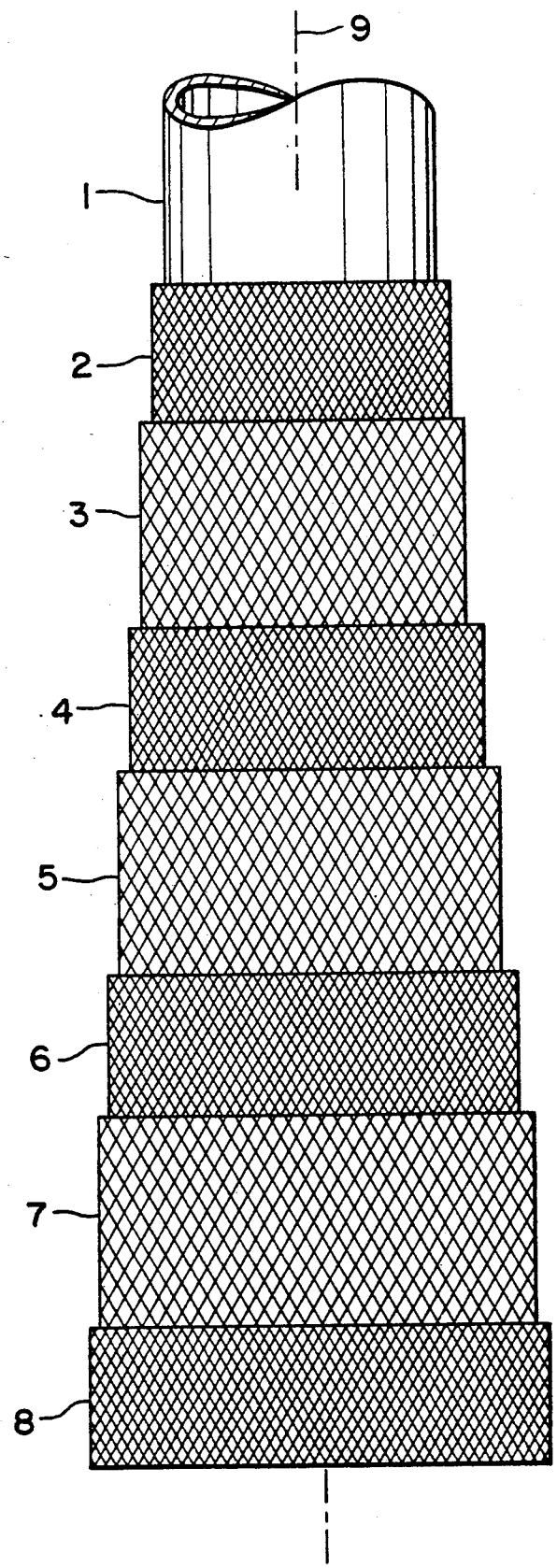

COMPOSITION MATERIAL TUBE SUBSTANTIALLY INSENSITIVE TO THE VARIATIONS OF LENGTH UNDER THE EFFECT OF THE INTERNAL PRESSURE

This is a continuation of application Ser. No. 316,787, filed Feb. 28, 1989 is now abandoned.

BACKGROUND OF THE INVENTION

The present invention relates to a new composite tube structure having substantially no variation of length under the effect of the internal pressure.

By composite material should be understood a material comprising fibers parallel to each other, such as glass fibers, carbon fibers, aramide fibers, encased in a matrix, such as a thermoplastic or heat hardenable matrix, e.g. an epoxy resin.

The present invention applies more particularly to the production of tubes for transferring or retaining pressurized fluids, such as water or hydrocarbons.

More particularly, the tubes of the present invention are intended to be used in offshore oil prospection and working operations, for example such as main or auxiliary upgoing and downgoing columns connecting the bottom of the sea to a surface support, such as a drilling or working platform or a subsurface buoy. Such columns are generally called "riser" or "tubing".

The production risers of fixed platforms or platforms with stretched lines in normal use protect the production tubes, also called tubings, without being subjected to the pressure prevailing in the deposit. The risers are however designed to withstand internal pressures in the case of accidents, e.g. leaks or breakage of the production tube.

These risers, considering their great length, undergo considerable variations of elongation due particularly to the tractive force induced by the bottom effect resulting from possible pressures which may reign inside these risers, to their weight or their temperature variations. To balance these variations, the risers are either subjected to an appreciable pre-stress under traction, or are held stretched by means of complex tensioning systems providing a tractive force which may be constant or equal to a minimum value depending on the operating conditions.

The tube of the invention, which has considerable flexibility to any tractive force in the absence of internal pressure, is particularly well adapted to this type of riser, for it makes it possible to suppress all or a part of the system holding the riser under a tractive force depending on the elongation.

The head tractive force at the upper end of the tube, in the absence of internal pressure, corresponds to that required for taking up the weight of the tube itself multiplied by a certain factor greater than 1 (1.7 for example), so as to maintain the profile of the riser within acceptable limits, despite external forces resulting, for example, from the effect of the current for an immersed line.

Should a tube of the prior art be subjected to an accidental pressure, the pressure will act on the top of the tube and communicate thereto a considerable force, which will result in elongation of the tube. Such elongation requires to be taken up by a tensioning system so as to avoid collapse in the lower part of the riser.

When subjected to an internal pressure, the tube of the present invention has a zero or very low longitudinal elongation, avoiding, consequently, the need for the tensioning system.

The tube of the present invention may also be used as production tube or riser ending at a subsurface buoy : in these precise cases, the tubes are fixed at their lower and upper ends without a permanent tensioning system. The pressure and temperature conditions under which prior art tubes are placed is accompanied by a tendency to buckle, to which the tubes react by bearing on surrounding systems (specially provided buckling guides) and possibly creating high flexion-compression stresses at the lower ends. By using the tubes of the present invention, the guide systems can be reduced or suppressed, the initial pretensioning can be simplified and the flexion-compression stresses at the foot can be reduced.

The tube of the present invention may also be used as a production tube or water or gas injection tubing, or either inside one of the above described risers, or directly inside the well; whether on land or at sea. The pressure and/or temperature conditions under which the prior art tubes are placed is accompanied by a similar tendency to buckling the tubes reacted by bearing on the casings in the well or risers, or by possibly creating high flexion-compression stresses at the lower ends.

The present invention reduces or suppresses the initial tensioning, or suppresses the system of sliding joints at the foot by replacing them by housings or reducing the foot flexion stresses.

The tube of the present invention may also be used for the peripheral lines of offshore drilling columns, these columns serving for protecting the drill strings. The peripheral lines may be safety lines (kill and choke lines) or mud injection lines (boosters). The tubes of the prior art are sliding at their ends. When they are placed under internal pressure, a lateral instability develops equivalent to buckling which tends to cause them to come violently out of their guide system; the use of a tube of the present invention by embedding it at the ends, and causing the induced tractive forces to be taken up by end stops, makes it possible to do without any intermediate guide system.

The present invention may also be used to form production tubes or tubings for wells drilled from solid ground.

Similarly, the tube of the present invention may be used as production tubing inside a well on land or at sea, or inside a sea riser.

The present invention could also be applied to underwater collecting ducts which are to be embedded, i.e. disposed at the bottom of a trench, to avoid the risks of damage due to navigation.

In fact, the ducts of the prior art, once buried, tend to elongate when they are pressurized and thus risk being deformed and rise up vertically out of the trench, which obviously cancels out the embedding effect.

The tube of the present invention appreciably reduces these risks.

The examples of application given above are in no wise limitative.

The composite tubes generally comprise superimposed layers each of which comprises fibers disposed at equal or symmetrical angles with respect to the axis of the tube and embedded in a matrix. This matrix adheres to the fibers.

Some of these layers may be adapted to withstand more particularly the pressure reigning inside the tube or internal pressure and others more particularly tractive forces. The pressure resistant layers then comprise groups of fibers wound at a high angle with respect to the axis of the tube, whereas the tractive force resistant layers comprise fibers wound at a small angle with respect to the axis of the tube.

The composite tubes according to the teaching of the prior art are constructed to withstand tractive and internal pressure forces and do not have a substantially zero elongation under the effect of the internal pressure.

In fact, generally traditional tubes withstanding the internal pressure, made from carbon fibers, aramide fibers of glass fibers elongate, under the effect of the internal pressure, respectively by about 0.4%, 0.6%, 0.8% at their working pressure limit.

The composite tube of the present invention has a much lower, even zero or negative elongation. The composite material tube of the present invention, considering its performances, makes it possible to envisage new applications for composite material tubes, and in addition it reduces the above mentioned drawbacks.

In the following description of the present invention, unless otherwise specified, by group of fibers is meant an assembly of fibers parallel to each other, of the same composition, embedded in a matrix, and by layer one or more groups of fibers wound at a substantially constant angle in absolute value with respect to the winding axis and comprising an equal proportion of fibers wound in one direction at the above mentioned angle, and fibers wound in the opposite direction at this same angle.

Thus, for the same layer, there are as many fibers wound at angle theta with respect to the winding axis as there are fibers wound at the angle -theta with respect to the winding axis.

Finally, the cohesion of one or more layers is provided by the matrix which adheres to the fibers and which forms a substantially continuous medium.

SUMMARY OF THE INVENTION

Thus, the present invention relates to a composite material tube, substantially insensitive to the variations of elongation under the effect of the internal pressure, comprising a number n of stable layers of reinformcement fibers, the fibers of each layer (i) being placed at the same winding angle in absolute value, referenced theta, with respect to the axis of the tube with an equal proportion of fibers wound at said angle in one direction (|theta|) as fibers wound in the opposite direction (−|theta|). The fibers of each layer are buried in a matrix which adheres to these fibers, the fibers of the same layer and the associated matrix having a volume referenced Y. The parallel fibers of the same layer and the associated matrix having overall a modulus of elasticity in the natural direction of the fibers, referenced E, according to the present invention the n layers of fibers comply as a whole with the following relationship :

0.35 ≦ A 0.60 where A is equal to the following expression :

$$A = \frac{\sum_{i=1}^{i=n}[E_i Y_i(\sin^2|\text{theta}_i|) \cdot (\cos^2|\text{theta}_i|)]}{\sum_{i=1}^{i=n}[E_i Y_i \sin^4|\text{theta}_i|]}$$

i being the summation index on the different fiber layers.

So as to reduce the influence of an error in the angle of positioning the fibers of a group, i.e. increasing the acceptable tolerance with respect to this manufacturing parameter, a structure such as :

0.40 ≦ A ≦ 0.60 will be preferable, or even better a structure such as :

0.43 ≦ A 23 0.52

The reinforcement fibers may be made from glass, aramide, carbon or any other materials taken alone or in combination. The groups of reinforcement fibers may be associated in pairs of groups of identical fibers, one of the groups forming an angle of +theta with the axis of the tube, the other group of the pair forming an angle −theta.

In accordance with the tube of the present invention, the reinforcement fibers of at least one layer may be fibers comprising glass, carbon or aramide.

The tube of the present invention may comprise at least two layers, one of said layers may comprise fibers wound at a small angle with respect to the axis of the tube and the other may comprise fibers wound at a high angle with respect to the axis of the tube. The overall modulus of elasticity in the natural direction of the fibers, of the layer with low winding angle, may be greater than the overall modulus of elasticity, in the natural direction of the fibers, of the layer with high winding angle. The present invention may comprise at least two layers, one of these layers may comprise fibers wound at an angle between 55° and 90° and the other layer may comprise fibers wound at an angle whose absolute value is between 10° and 45° When the tube only has two layers the overall proportion of one of the layers by volume with respect to the overall assembly of the two layers, may be between 35 and 65%.

The tube of the present invention may comprise a layer at a winding angle substantially equal to 70°, with respect to the axis of the tube, the overall modulus of elasticity in the natural direction of the fibers being close to the range 50 000-56 000 MPa, this tube may also comprise a layer at a winding angle substantially equal to 26° with respect to the axis of the tube, the overall modulus of elasticity in the natural direction of this layer oriented at 26° being close to 140 000 MPa, and the proportions of the layer at 70° and of the layer at 26° may be respectively and substantially equal to 55% and 45% by volume. The composite layer of the present invention may comprise a layer at a winding angle substantially equal to 70°, with respect to the axis of the tube, the overall modulus of elasticity in the natural direction of these fibers being close to the range 50 000-56 000 MPa, this tube may also comprise a layer at a winding angle substantially equal to 30° with respect to the axis of the tube, the overall modulus of elasticity in the natural direction of this layer oriented at 30° being close to 100 000 MPa, and the proportion of the layer at 70° and of the layer at 30° may be respectively substantially equal to 50% and 50% by volume.

The tube of the present invention may comprise at least one layer having reinforcement fibers wound at an angle substantially equal in absolute value to 38°, with respect to the axis of the tube, and at least one layer having reinforcement fibers wound at an angle substantially equal in absolute value to 62°, with respect to the axis of the tube, and the overall proportions by volume of the layer at 38° and of the layer at 62° with respect to the assembly of these two layers are respectively substantially equal to 45% and 55%.

Thus, as has been said, the tube of the present invention may be used in the construction of a riser for a drilling or production platform. Similarly, it may be used as production tubing inside a well on land or at sea, or inside a sea riser.

BRIEF DESCRIPTION OF THE DRAWINGS

The accompanying single Figure of the drawing is an isometric view of a composite tube to which the present invention applies.

DESCRIPTION OF THE PREFERRED EMBODIMENT

This tube comprises an internal sheath 1 on which is stacked a succession of composite layers 2, 3, 4, 5, 6, 7, each of which includes groups of reinforcement fibers. These groups are for example disposed by alternating groups 2, 4, 6, 8 withstanding the forces due to the pressure and groups 3, 5, 7 withstanding the tractive forces.

Thus, we may have a tube with two series of composite layers. The first series of these composite layers 3, 5, 7 is formed of carbon fibers wound symmetrically with respect to the longitudinal axis 9 of the tube at angles $+/-26°$, the composite material having, along the the axis of the fibers, a modulus of elasticity or Young's modulus $E_1 = 140\,000$ MPa.

The second series of these composite layers 2, 4, 6, 8 is formed of glass fibers wound symmetrically with respect to the axis 9 of the tube at angles of $+/-70°$, the composite material having along the axis of the fibers a modulus of elasticity $E_2 = 56\,000$ MPa. The inner diameter of the tube is 23 cm.

The cumulative thicknesses for the series of layers are respectively 0.75 cm for the first series and 0.91 cm for the second series.

The proportions by volume of resin in each of the series of composite layers are respectively 40% for the first and 33% for the second. The first series of layers comprises three layers inserted between four layers of the second series.

The proportions by volume of the composite glass materials and of the carbon composite are respectively 55% and 45%.

The elongation relative to this tube is $3.10-4$ when the pressure to which it is subjected is 350 bars.

A tube with very low elongation may be obtained by replacing in the above example the glass fibers by aramide fibers with low modulus (KEVLAR 29). The proportions of the composites and the winding angles remain unchanged. Another example for obtaining a tube with very low elongation consists in using a glass composite whose fibers are wound at 70° with respect to the axis of the tube and an aramide composite material with high modulus of elasticity (KEVLAR 49) whose fibers are wound at 30° with respect to the axis 9 of the tube. The proportions of composite glass material and of composite KEVLAR material are respectively 50% and 50%.

A tube may also be obtained having a very low elongation by substituting in the above example low modulus aramide fibers (e.g. KEVLAR 29) for the glass fibers.

The proportions of the composite materials and the winding angles remain unchanged.

The longitudinal Young's modulus of the composite KEVLAR 49 is close to 100 000 MPa and that of the composite material KEVLAR 29 close to 50 000 MPa. The names KEVLAR 49 and KEVLAR 29 are trademarks registered by the firm Dupont de Nemours.

The table below sums up the examples given above:

| NATURE OF THE FIBERS | WINDING ANGLE IN ABS. VALUE | PROPORTION BY VOLUME |
| --- | --- | --- |
| glass | 70° | 55% |
| carbon | 26° | 45% |
| glass | 70° | 50% |
| aramide (high modulus of elasticity (KEVLAR 49) | 30° | 50% |
| aramide (low modulus of elasticity) (KEVLAR 29) | 70° | 55% |
| carbon | 26° | 45% |
| aramide (low modulus of elasticity) (KEVLAR 29) | 70° | 50% |
| aramide (high modulus of elasticity) (KEVLAR 49) | 30° | 50% |

In the same way that tubes can be produced having a very low elongation with two composite materials, such tubes can be formed with a single composite material. This is obtained, for example, by winding fibers at angles of $+/-38$ and $+/-62°$, With respect to the axis 9 of the tube. The proportions by volume of the fibers at 38° and 62° and of their associated matrix are respectively 45% and 55%. The nature of these fibers does not modify the characteristics of the tube. Finally, generally, when two layers are used comprising fibers of different natures, it is preferable to have:

a layer with fibers placed at an angle between 55° and 90°, and another layer comprising fibers placed at an angle between 10° and 45°.

In the case of two types of different fibers, the layers having the highest Young's modulus in the natural direction of the fibers will be laid with the small angle, and those with the lowest Young's modulus in the natural direction of the fibers will be laid with the high angle.

Finally, it should be noted that preferably the same layer may comprise one or more groups of fibers wound so that these groups are adjacent side by side.

What is claimed is:

1. A composite material tube having substantially no variations of length under an effect of an internal pressure of a fluid conveyed through said tube, the composite material tube comprising a plurality of stable layers of reinforcement fibers, the reinforcement fibers of each layer being placed at the same winding angle $\theta$ in absolute value with respect to a longitudinal axis of the tube with an equal proportion of fibers wound at said angle $\theta$ in one direction as fibers wound in the opposite direction, the fibers of each layer being embedded in a resin matrix adhering to the fibers, the fibers of the same layer and the associated matrix having a volume Y, and parallel fibers of the same layer and the associated matrix having an overall modulus of elasticity in a natural direction E of the fibers, wherein said layers of fibers have the following relationship:

$$0.35 < A < 0.60,$$

where:

A is determined in accordance with the following equation:

$$A = \frac{\sum_{i=1}^{i=n}[E_iY_i(\sin^2|\theta_i|)\cdot(\cos^2|\theta_i|)]}{\sum_{i=1}^{i=n}[E_iY_i\sin^4|\theta_i|]},$$

2. The tube as claimed in claim 1, wherein $0.40 \leq A \leq 0.60$.

3. The tube as claimed in claim 2, wherein $0.43 \leq A \leq 0.52$.

4. The tube as claimed in one of claims 1 to 3, wherein the reinforcement fibers of at least one layer are fibers comprising glass, carbon or aramide.

5. The tube as claimed in claim 4, comprising at least two layers, wherein one of said at least two layers comprises fibers wound at a smaller angle with respect to an axis of the tube than an angle of the other of said at least two layers comprises fibers with respect to the axis of the tube, and wherein the overall modulus of elasticity in a natural direction of the fibers of the layer with the smaller winding angle, is greater than an overall modulus of elasticity in a natural direction of the fibers of the other layer.

6. The tube as claimed in claim 5, wherein one of said at least two layers comprises fibers wound at an angle of between 55° and 90°, and the other of said two layers comprises fiber wound at an angle whose absolute value is between 10° and 45°.

7. The tube as claimed in claim 6, only having two layers, and wherein an overall proportion of one of the two layers by volume with respect to an overall assembly of the two layers is between 35% and 65%.

8. The composite tube as claimed in claim 7, wherein said one layer is wound at a winding angle substantially equal to 70° with respect to the axis of the tube, the overall modulus of elasticity in the natural direction of the fibers being close to a range of 50 000–56 000 MPa, and wherein the other layer is wound at a winding angle substantially equal to 26° with respect to the axis of the tube, the overall modulus of elasticity in the natural direction of the fibers of said other layer oriented at 26° being close to 140 000 MPa, and proportions of said one layer at 70° and of the other layer at 26° respectively and substantially equal to 55% and 45% by volume.

9. The composite tube as claimed in claim 7, wherein one of said layers is wound at a winding angle substantially equal to 70°, with respect to the axis of the tube, the overall modulus of elasticity in the natural direction of the reinforcement fibers being close to a range of between 50 000–56 000 MPa, and the other of said layers is wound at a winding angle substantially equal to 30° with respect to the axis of the tube, the overall modulus of elasticity in the natural direction of the fibers of said other layer oriented at 30° being close to 100 000 MPa and proportions of said one layer at 70° and of said other layer of 30° are respectfully substantially equal to 50% and 50% by volume.

10. The tube as claimed in claim 4, comprising at least one layer having reinforcement fibers wound at an angle substantially equal in absolute value to 38°, with respect to an axis of the tube, and at least one other layer having reinforcement fibers wound at an angle substantially equal in absolute value to 62°, with respect to the axis of the tube, and overall proportions by volume of said at least one layer at 38° and of said at least one other layer at 62° with respect an assembly of said two layers are respectfully substantially equal to 45% and 55%.

11. Use of the tube as claimed in claim 10 in a construction of a riser for at least one of a drilling and production platform.

12. Use of the tube as claimed in claim 10 as tubing inside a well on land or at sea, or inside a sea riser.

13. A tube as claimed in claim 4, comprising at least two layers, wherein one of said at least two layers comprises fibers wound at an angle of between 55° and 90° and the other of said two layers comprises fibers wound at an angle whose absolute value is between 10° and 45°.

14. The tube as claimed in claim 13, only having two layers and an overall proportion of one of the two layers by volume with respect to an overall assembly of the two layers, is between 35% and 65%.

15. The tube as claimed in claim 14, wherein said one layer is wound at a winding angle substantially equal to 70°, with respect to an axis of the tube, an overall modulus of elasticity in a natural direction of the fibers is close to a range of between 50 000–56 000 MPa, and wherein the other layer is wound at a winding angle substantially equal to 26° with respect to the axis of the tube, an overall modulus of elasticity in the natural direction of the fibers of said other layers oriented at 26° being close to 140 000 MPa, and proportions of said one layer at 70° and of the other layer at 26° are respectively and substantially equal to 55% and 45% by volume.

16. The tube as claimed in claim 14, wherein one of said layers is wound at a winding angle substantially equal to 70° with respect to the axis of the tube, the overall modulus of elasticity in a natural direction of the reinforcement fibers being close to a range of between 50 000–56 000 MPa, and the other of said layers is wound at a winding angle substantially equal to 30° with respect to the axis of the tube, the overall modulus of elasticity in a natural direction of the fibers of said other layer oriented at 30° being close to 100 000 MPa, and proportions of said one layer at 70° and said other layer at 30° are respectively substantially equal to 50% and 50% by volume.

17. Use of the tube as claimed in claim 16, in a construction of a rise for at least one of a drilling and production platform.

18. Use of the tube as claimed in claim 16, as tubing inside a well on land or at sea, or inside a sea riser.

19. The tube as claimed in one of claims 1, 2 or 3, comprising at least two layers, wherein one of said at least two layers is wound at a winding angle substantially equal to 70°, with respect to an axis of the tube, an overall modulus of elasticity in a natural direction of the fibers being close to a range of 50 000–56 000 MPa, and wherein the other of said at least two layers is wound at a winding angle substantially equal to 26° with respect to the axis of the tube, an overall modulus of elasticity in a natural direction of the fibers of said other layer oriented at 26° being close to 140 000 MPa and proportions of said one layer at 70° and said other layer at 26° are respectively and substantially equal to 55% and 45% by volume.

20. The tube as claimed in one of claims 1, 2, or 3, comprising a single layer wound at a winding angle substantially equal to 70° with respect to an axis of the rube, an overall modulus of elasticity in a natural direction of the reinforcement fibers being close to a range of between 50 000–56 000 MPa, and another layer wound at a winding angle substantially equal to 30°, with respect to the axis of the tube, and overall modulus of elasticity in a natural direction of the fibers of said another layer oriented at 30° being close 100 000 MPa and proportions of said one layer at 70° and said another layer at 30° are respectively substantially equal to 50% and 50% by volume.

21. The tube as claimed in one of claims 1, 2 or 3, comprising at least one layer having reinforcement fibers wound at an angle substantially equal in absolute value to 38° with respect to an axis of the tube, and at least one other layer having reinforcement fibers wound at an angle substantially equal in absolute value to 62°, with respect to the axis of the tube, and overall proportions by volume of said at least one layer at 38° and of said at least one other layer at 62° with respect to an assembly of said two layers are respectively substantially equal to 45° and 55°.

* * * * *